L. MOORE,

Assignor to S. E. Griscom.

MILLSTONE DRESSING-MACHINE.

No. 7,754. Reissued June 19, 1877.

Witnesses,
Henry Howson Jr
Harry Smith

Inventor
Leonard Moore
by his Attorneys
Howson and Sons

N. PETERS, PHOTO-LITHOGRAPHER, WASHINGTON, D. C.

UNITED STATES PATENT OFFICE.

LEONARD MOORE, OF COLE'S CREEK, ASSIGNOR TO SAML. E. GRISCOM, OF POTTSVILLE, PENNSYLVANIA.

IMPROVEMENT IN MILLSTONE-DRESSING MACHINES.

Specification forming part of Letters Patent No. 186,686, dated January 30, 1877; reissue No. 7,754, dated June 19, 1877; application filed May 17, 1877.

*To all whom it may concern:*

Be it known that I, LEONARD MOORE, of Cole's Creek, in the county of Columbia and State of Pennsylvania, have invented a new and useful Adjustable Base-Plate for Diamond Millstone-Dressing Machines, of which the following is a specification:

The object of my invention is to so construct a millstone-dressing machine that the cutter may be made to take an inclined course in respect to the face of the stone without disturbing the bearing of the base of the machine on the same.

Figure 1:
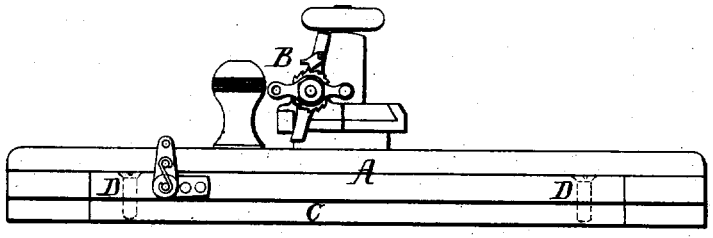
Figure 2:
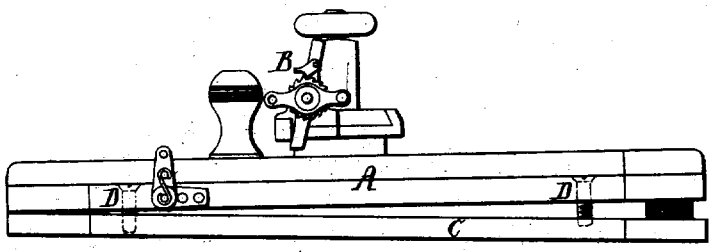

In the accompanying drawing, Figures 1 and 2 are side views of a millstone-dressing machine with my improvement.

C is the bed-plate of the machine; B, the cutter-carriage and mechanism for operating the same, and A the guide-plate between the carriage and bed-plate.

The guide-plate, cutter-carriage, and operating mechanism may be similar to those of other machines—those described in the patent of Daniel Larer, for instance, granted November 25, 1873, and numbered 144,851.

In using the Larer machine and other machines of the same class it has been the practice to place the guide-plate A directly on the stone, and, when it became necessary to cut deeper at one part of the stone than another, to tilt the said plate, and retain it by packing-pieces at the inclination demanded by the desired course of the cutter.

By this crude plan of adjusting the guide-plate of the Larer machine the bearing-surface on the stone was so restricted that in moving the machine from one place to another it might assume different inclinations, and this would result in irregular dressing. In other words, the packing-pieces bearing on the stone might be affected by local irregularities which would not disturb a plate bearing directly on the stone. Hence I use in connection with the guide-plate a bed-plate, C, on which the guide-plate is made adjustable by means of set-screws D D and packing-pieces or other equivalent devices.

By thus interposing an adjustable guide-plate between the cutter-carriage and a bed-plate, the said guide-plate can be arranged at any inclination which the desired course of the cutter may demand without any restriction of the bearing-surface of the machine, for the entire surface of the bed-plate must always bear on the stone; hence the uniform course of the cutter is not so liable to be affected by changes in the position of the machine as when the inclination of the guide-plate depends upon packing-strips inserted between it and the stone.

I claim as my invention—

1. The combination, in a millstone-dressing machine, of the following elements, namely, a bed-plate, C, to bear on the stone, a cutter-carriage, and an intermediate plate, through the medium and by the adjustment of which the said cutter-carriage may be tilted, substantially in the manner described.

2. The adjustable guide-plate A, in combination with the bed-plate C and screws D D.

In testimony whereof I have signed my name to this specification in the presence of two subscribing witnesses.

LEONARD MOORE.

Witnesses:

LESLIE GRISCOM,
WALTER GRISCOM.